J. H. HALL.
SYSTEM OF CONTROL FOR ELECTRIC CONTROLLERS.
APPLICATION FILED NOV. 27, 1911.
1,062,707.
Patented May 27, 1913.
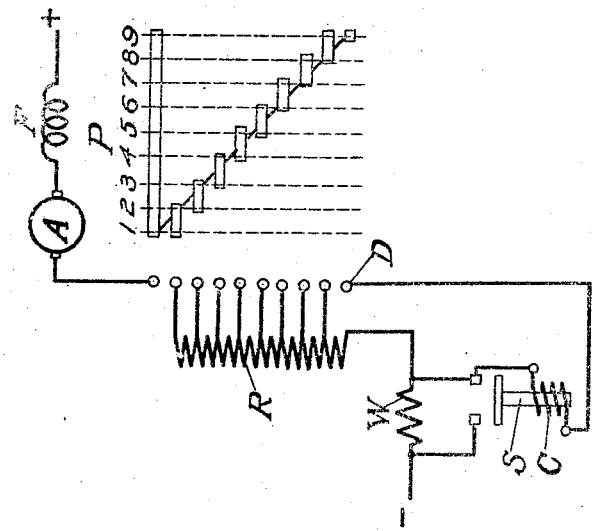
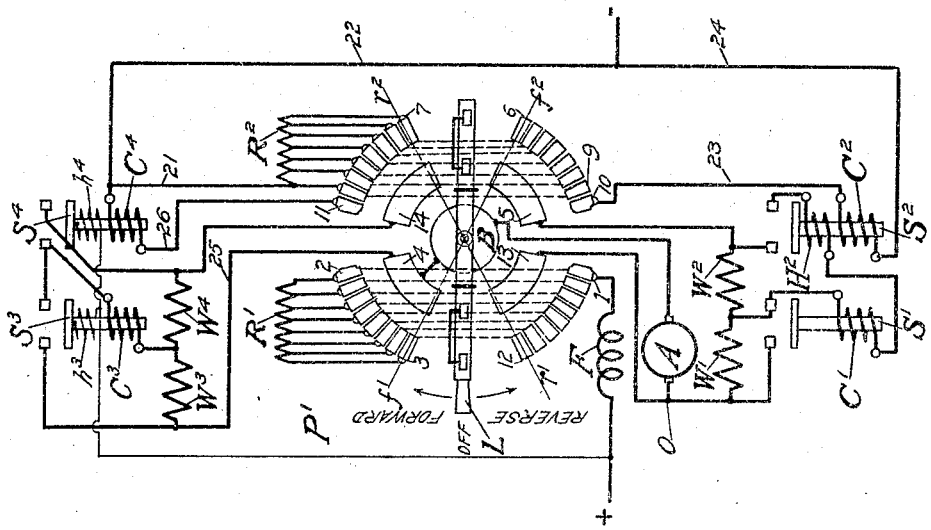
WITNESSES:
INVENTOR.
Jay H. Hall
BY
F. N. Barber
ATTORNEY.

UNITED STATES PATENT OFFICE.

JAY H. HALL, OF CLEVELAND, OHIO, ASSIGNOR TO THE ELECTRIC CONTROLLER AND MANUFACTURING COMPANY, OF CLEVELAND, OHIO, A CORPORATION OF OHIO.

SYSTEM OF CONTROL FOR ELECTRIC CONTROLLERS.

1,062,707.  Specification of Letters Patent.  Patented May 27, 1913.

Application filed November 27, 1911. Serial No. 662,590.

*To all whom it may concern:*

Be it known that I, JAY H. HALL, a citizen of the United States, residing at Cleveland, in the county of Cuyahoga and State of Ohio, have invented new and useful Improvements in Systems of Control for Electric Controllers, of which the following is a specification.

My invention relates to the control of electric motors, principally that type in which a manually-operated controller is used in conjunction with automatically - operated switches for governing an electric motor.

When starting a motor by means of a manually-operated controller, it is possible for the operator to move his controller too rapidly and cause an excessive amount of current to flow through the motor. A still greater current can be caused to flow if the controller is moved too rapidly to reverse the motor.

Among the objects of my invention are—to prevent an excessive flow of current in the motor circuit when a manually-operated controller is used to govern an electric motor; to prevent an excessive amount of current flowing in the motor circuit when a manually-operated controller is moved too rapidly to reverse a motor; to control the cutting out of certain portions of the resistance in accordance with the strength of current flowing in the motor circuit; and to prevent the opening of the magnetically-operated switches when current is flowing through their contacts.

In carrying out my invention I provide a manually-operated controller which directly controls the cutting in of the resistance in the motor circuit, but which directly controls the cutting out of only a portion of the resistance. Associated with the controller I provide one or more magnetically-operated switches for controlling a portion of the resistance, the operating windings of which are energized in certain positions of the controller by connecting them in the motor circuit. These switches are adapted to close their contacts only when the current in their windings is below a certain predetermined value, so that the cutting out of the resistance controlled by these switches depends upon the strength of the current in the motor circuit.

To further explain my invention I will refer to the accompanying drawings, Figures 1 and 2, which show diagrammatically two forms which my invention may assume.

Referring to Fig. 1, P is a diagrammatic representation of the ordinary drum type controller arranged to cut in and out of the motor circuit portions of the resistance. The motor is shown with armature A and the series-field winding F. Associated with this controller is the resistance W, which is arranged to be cut out of the circuit automatically by the magnetically-operated switch S, having the operating-winding C. I prefer to use for the switch S the type of switch disclosed in Canfield's applications, Serial Numbers 583,000, filed September 21, 1910, and 604,331, filed January 24, 1911, and Eastwood's Patent, No. 1,040,292, granted October 8, 1912, which switch has the peculiar characteristic of locking itself open when its winding is excited above a predetermined value, and operating to close its contacts when the excitation is reduced to or below that value.

The operation of the controller is as follows: Upon moving the manually operated controller P to the position 1, the motor circuit is established from the positive through the series field F, the armature A, the entire resistance R, and the resistance W to the negative. The current in this circuit starts the motor which then runs at its slowest speed. To increase the speed of the motor the controller P is moved to its successive positions 2, 3, 4, etc., gradually cutting out portions of the resistance R. When the position 8 is reached, the last section of the resistance R and the resistance W constitute the amount of resistance then included in the motor circuit. Upon moving the controller to the position 9 contact is made with the last contact finger D, and the motor circuit now flows from the positive through the field F, the armature A, the finger D, the operating windings C of the switch S, and the resistance W to the negative. The last section of the resistance R is now short-circuited by the winding C, and practically all of the motor current flows through the winding C, and if this amount of current is greater than the value at which the switch S is adjusted to operate, the switch S will be locked open and the resistance W will still remain in the motor circuit. As soon as the motor current decreases to the value at which the switch S is adjusted to operate, it closes its contacts, thereby short-circuiting the resistance W. The motor circuit now contains only the motor windings, the controller contacts, and the operating winding of the switch S, and the motor will operate at its normal full-load speed. When the operator wishes to slow down or stop the motor, on moving the controller back to position 8 the circuit through the finger D is interrupted at the contacts of the controller, and the winding C is therefore deënergized and the switch falls open, inserting the resistance W in the motor circuit. Upon moving the controller farther toward the off-position, more and more of the resistance R is inserted in the motor circuit until the off-position is reached, whereupon the motor circuit is interrupted at the first two contact fingers of the controller.

If the operator, in starting the motor, moves the controller P to the position 9 too rapidly, the resistance R is cut out of circuit but the resistance W remains in circuit. The latter will be so proportioned as to limit the current flowing through the motor to a safe value. The switch S remains locked open by the excessive current through its winding until the current decreases to the value at which the switch is adjusted to operate, at which time the resistance W is short-circuited. No matter how rapidly the operator advances his controller to the full running position, the limiting resistance W can never be cut out until the motor has reached a proper speed, corresponding to the value of current at which the switch S operates.

In Fig. 2, P' represents the well-known face-plate type of manually operated reversing controller, in which the arm L sweeps over concentric sets of segments adapted to regulate the resistances R' and R² in the motor circuit. Associated with this controller are four magnetically operated switches, two of which, S' and S², are arranged to control the resistances W' and W² when the motor is connected to run in one direction; and the switches S³ and S⁴ are adapted to control the resistances W³ and W⁴ when the motor is connected to run in the opposite direction. The switches S' to S⁴ are of the same type of switch as the switch S described in Fig. 1, and in addition to their operating windings C' to C⁴, the switch S² has a holding winding H² which is arranged to be connected in series with the contacts of the switch, and holds the switch closed after it has been closed by its operating winding C². The switches S³ and S⁴ have shunt-wound holding windings $h^3$ and $h^4$. One terminal of these windings is connected to the positive main; the other terminal of each winding is connected to the movable portion of the switch and becomes energized upon the closure of the switch. The outer row of contacts of the controller P', which are connected to the resistance R', are cross-connected to the lower row of contacts, as indicated by dotted lines. In like manner, the contacts connected to the resistance R² are cross-connected to a similar set of contacts, as shown by dotted lines. The segments 10 and 11, instead of being cross-connected, are connected to the operating windings of the switches S² and S⁴. A blow-out magnet with the winding B is provided for the controller P', which is connected in the armature circuit, and is adapted to extinguish any arc which is formed at the contacts of the controller.

Since in the arrangement shown in Fig. 2 the controller P' is provided for extinguishing any arc which may be caused by rupturing the motor circuit, it is desirable to confine all of the arcing to the contacts on the controller, and prevent any arcing at contacts of the magnetically-operated switches S' to S⁴. This obviates the necessity of providing blow-out magnets for each individual switch, and, with this purpose in view, I have so arranged the connections that the magnetically-operated switches will always be held closed so long as current is passing through their contacts.

The operation of the controller is as follows: On moving the controller to the first position in the "forward" direction, indicated by the line $f'$ $f^2$, the brushes of the contact arm L will connect the segments 3 and 4 and the segments 5 and 6. The motor circuit will then be established as follows: from the positive through the field winding F, the contact 1, the cross connection to the contact 2, the resistance R', the contact 3, the brushes of the arm L, the contact 4, the blow-out winding B, through the motor armature A from right to left, the point O, the resistances W' and W², the contact 5, the brushes of the contact arm L, the contact 6, the cross connection to the contact 7, the resistance R², and the conductors 21 and 22 to the negative. The motor circuit now includes the motor windings, the resistances R' and R², which are controlled directly by the manually operated controller P', and the resistances W' and W² which are controlled by the magnetically-operated switches S' and S². The establishment of this circuit starts the motor, and it will run at its slowest speed. On moving the controller arm in the forward direction, more and more of the resistances R' and R² is cut out of the circuit, until the position is reached when the right-hand arm of the controller rests on the contact 9. Upon moving the contact arm to the last position, that is, when the contacts 2 and 4 are connected together, and the contacts 5 and 10, the winding C² of the switch S² is included in the motor circuit, and the motor circuit is as follows: from the positive through the field winding F, the contact 1, the cross connection to the contact 2, the brushes of the contact arm, the contact 4, the blow-out winding B, the armature A, the resistances W' and W², the contact 5, the brushes of the controller arm, the contact 10, the conductor 23, the winding C², and the conductor 24 to negative. At this time the resistances R' and R² are all cut out of the motor circuit, and the current is limited by the resistances W' and W². If, when the controller arm reaches the contact 10, the motor current is not above the value at which the switch S² is adjusted to close, this switch will close immediately and short-circuit the resistance W², at the same time connecting the holding winding H² of the switch S² and the operating winding C' of the switch S' in the motor circuit. If the cutting out of the resistance W² allows the current in the motor circuit to increase above the value at which the switch S' is adjusted to operate, this switch will be locked open until the motor current has decreased to the proper value, at which time it will close and short-circuit the resistance W'. The motor is now connected directly across the line, having in its circuit the switch windings C², H², and C'.

When the operator wishes to reduce the speed of the motor, he will move his controller arm toward the off-position. When the brush of the contact arm leaves the contact 10, the winding C² of the switch S² is deënergized, but this switch does not fall open, because the winding H² is still in the motor circuit and holds the switch closed. As the controller arm is moved toward the off-position more and more of the resistances R' and R² is inserted in the motor circuit, and when the controller arm reaches the off-position the motor circuit is interrupted at the contacts of the controller, and the windings H² and C' are deënergized, allowing the switches S' and S² to open. If the operator moves his controller arm quickly to the full on-position in the forward direction, he will rapidly cut out the resistances R' and R², but the resistances W' and W² will remain in circuit and will be cut out automatically by the operation of the switches S' and S², the winding C² of the switch S² first locking the switch open until the motor current is reduced to a certain predetermined value, whereupon the switch S² closes and cuts out the resistance W². The closure of the switch S² energizes the winding C' of the switch S', as before, and the resistance W' is cut out only after the motor current has again decreased to the proper value after the closure of the switch S². To cause the motor to run in the opposite direction, the operator moves the contact arm of the controller to the direction marked "Reverse," and when the arm is in position $r'$ $r^2$, the motor circuit is as follows: from positive through the field winding F, the contact 1, the cross-connection to the contact 2, the resistance R', the contact 3, the cross-connection to the contact 12, the brushes of the contact arm L, the contact 13, the point O, the armature A from left to right, the blow-out winding B, the contact 4, the conductor 25, the resistances W³ and W⁴, the contact 14, the brushes of the contact arm, the contact 7, the resistance R², and the conductors 21 and 22 to negative. The motor circuit now contains the motor windings, the resistances R' and R², and the resistances W³ and W⁴, and the motor runs at its slowest speed. As the controller arm is moved toward the full on-position, the resistances R' and R² are gradually cut out of circuit until the last position is reached, at which time the right hand end of the contact arm rests on the contact 11. The circuit now passes through the contact 11, the conductor 26, the winding C⁴ of the switch S⁴, and the conductor 22 to negative.

If the current in the motor circuit at the time that the winding C⁴ is energized is above the value at which the switch S⁴ is adjusted to operate, the switch will be locked open, but as soon as the motor current decreases to the value at which the switch is adjusted to operate, it will close its contacts and will cut out the resistance W⁴ and include the winding C³ of the switch S³ in the motor circuit. Upon the closure of the switch S⁴ its holding winding $h^4$ is energized from positive through the contacts of the switch to negative by way of the contact 14, the brushes of the contact arm L, the contact 11, the conductor 26, the winding C⁴ and the conductor 22. The cutting out of the resistance W⁴ by the closure of the switch S⁴ increases the current in the motor circuit and the switch S³ will be locked open until the current decreases to the point at which the switch S³ is adjusted to operate, whereupon this switch will close its contacts, cut out the resistance W³ and its own operating winding C³, and energize its holding winding $h^3$, the winding $h^3$ being energized through the same circuit as the winding $h^4$. The motor is now connected directly across the line. On moving the controller arm toward the off-position in order to slow down and stop the motor, the winding C⁴ of the switch S⁴ is deënergized but the switch S⁴ is held closed by its holding winding $h^4$, and the switch S³ is held closed by its holding winding $h^3$ until the arm of the controller reaches the off-position, at which time the motor circuit, as well as the circuit through the windings $h^3$ and $h^4$, is interrupted, and the switches S³ and S⁴ drop open.

In some classes of service, such as the operation of reversing mill tables in steel mills, it becomes necessary to quickly reverse a motor and change its motion from full speed in one direction to full speed in the opposite direction as quickly as possible. The operator will therefore move his controller from the full position in one direction to the full position in the other direction as quickly as he can, and with a controller arranged as shown in Fig. 2, it will be impossible for the current in the motor circuit to exceed a predetermined value as determined by the resistances W', and W², if the motor is running in one direction, and by the resistances W³ and W⁴ when the motor is running in the opposite direction.

It oftentimes happens with some controllers that the time required for moving the controller arm from the position $f'$ $f^2$ to position $r'$ $r^2$ is less than it takes for a magnetically operated switch to fall open, and it is, therefore, desirable that the connections be made so that a switch which is closed when the controller is in the forward position will not be reënergized and held closed when the controller is moved quickly to the reverse position.

It will be noticed by referring to Fig. 2 that the motor circuit containing the windings and contacts of the switches S' and S² can be energized only when the controller is in the forward position, and cannot be energized when the controller is in the reverse position. Therefore, the switches S' and S² can take their time in opening when the controller is moved from the forward position to the reverse position, without affecting the motor circuit while the motor is running in the reverse direction, or in any way causing an arc to be drawn on the contacts of the switches S' and S². In like manner the contacts and windings of the switches S³ and S⁴ are energized only when the controller is moved to operate the motor in the reverse direction.

I have shown two methods of holding the switches closed when the controller arm is moved away from the last position—one by using a series holding winding, as in the case of the switch S²; the other by using shunt holding windings, as in the case of switches S³ and S⁴. It will be readily understood that all of the switches may be equipped with shunt holding windings if so desired, or the holding windings on the switches S³ and S⁴ can be replaced by series holding windings connected as shown and described with regard to the holding winding H² on the switch S².

No matter how rapidly the operator advances his controller handle from the off-position to the full running position in either direction, or moves his controller handle from the full position in one direction to the full position in the other direction, the current in the motor circuit is always limited by either the resistances W', W², or W³, W⁴, and these resistances are cut out of circuit automatically by means of the magnetically-operated switches connected thereto and controlled by the current flowing in the motor circuit.

It will be readily understood that only one resistance and its corresponding automatic switch may be used in either direction of operation as the conditions warrant, and that a limiting resistance controlled by a magnetically-operated switch may be associated with any of the well-known types of manually-operated controllers.

I claim—

1. In an electric motor-control system, a motor, a circuit therefor, two resistances in series in said circuit, a manually-operated controller for regulating one resistance, a switch for controlling the other resistance, an operating winding therefor, and a contact in the manually-operated controller for connecting the winding in the motor circuit after the manually-controlled resistance is cut out of the circuit.

2. In an electric motor-control system, a motor, a circuit therefor, a resistance in said circuit, a manually-operated controller for cutting out the resistance, a second resistance in the circuit, a switch for cutting out the latter resistance, a winding adapted to control the switch and be connected in the motor circuit, and a contact on the controller for energizing the winding after the first resistance is cut out.

3. In a motor-control system, an electric motor having an armature, a circuit therefor, a resistance in said circuit, a manually-operated controller for cutting out the resistance, a second resistance in the circuit, a switch for cutting out the latter resistance, a winding adapted to control the switch and be connected in the armature circuit, and a contact on the controller for energizing the winding after the first resistance is cut out.

4. In a motor-control system, an electric motor having a field winding, a circuit therefor, a resistance in said circuit, a manually-operated controller for cutting out the resistance, a second resistance in the circuit, a switch for cutting out the latter resistance, a winding adapted to control the switch and be connected in the field circuit, and a contact on the controller for energizing the winding after the first resistance is cut out.

5. In a motor-control system, an electric motor having an armature and a series field winding, a circuit therefor, a resistance in said circuit, a manually-operated controller for cutting out the resistance, a second resistance in the circuit, a switch for cutting out the latter resistance, a winding adapted to control the switch and be connected in the circuit of the said armature and field winding, and a contact on the controller for energizing the winding after the first resistance is cut out.

6. In an electric motor-control system, a motor, a circuit therefor, two resistances in series in the circuit, an operator's switch for controlling one resistance, a magnetically-operated switch for controlling the other resistance, an operating winding therefor connected in the motor circuit by the operator's switch, and a winding for holding the switch closed until the motor circuit is interrupted at the operator's switch.

7. In an electric control system, a circuit, a resistance in the circuit, a manually-operated controller having a series of contacts for regulating the resistance, a second resistance, a switch for short-circuiting the latter resistance, an operating winding for the switch, and means for connecting the winding in the circuit when all the first resistance is cut out.

8. In an electric control system, a circuit, a resistance in the circuit, a manually-operated controller having a series of contacts for regulating the resistance, a second resistance, a switch for short-circuiting the latter resistance, an operating-winding for the switch, means for connecting the winding in the circuit when all the first resistance is cut out, and means for holding the switch closed until the circuit through its contacts is opened by movement of the controller.

9. In an electric motor-control system, a motor, a circuit therefor, a resistance in the circuit, means under control of the operator for cutting out the resistance, a second resistance, and means preventing the operator from cutting out the second resistance unless the motor current is below a predetermined value, the second means including a magnetically-operated switch having contacts in the circuit, and an operating-winding adapted to be connected in the circuit at the will of the operator.

10. In an electric motor-control system, a motor, a circuit therefor, a resistance in the motor circuit, a manually-operated controller for cutting out the resistance, a second resistance in the motor circuit, a switch for short-circuiting the latter resistance, an operating-winding for the switch, and means for connecting the winding in the motor circuit at or near the full-on position of the controller.

11. In an electric motor-control system, a motor, a circuit therefor, a resistance in the circuit, an operator's switch for regulating the resistance, a second resistance, means for cutting out the latter resistance only when the current in the motor circuit is below a certain value, the said means comprising a magnetically-operated switch having contacts which when closed short-circuit the latter resistance, and an operating-winding for closing the contacts energized by current in the motor circuit.

12. In an electric motor-control system, a motor, a circuit therefor, a reversing controller for the motor, two resistances, means for connecting one resistance in the motor circuit when the motor is connected to run in one direction and for connecting the other resistance in the motor circuit when the motor is connected to run in the opposite direction, a magnetically-operated switch for short-circuiting each resistance, operating windings for the switches, and means for including the winding of one switch in the motor circuit when the reversing controller is in a running position.

13. In an electric motor-control system, a motor, a circuit therefor, a manually-operated reversing controller for the motor, two resistances, means for connecting one resistance in the motor circuit when the motor is connected to run in one direction, and for connecting the other resistance in the motor circuit when the motor is connected to run in the opposite direction, a magnetically-operated switch for short-circuiting each resistance, operating windings for the switches, means for connecting one of the operating windings in the motor circuit when the controller is in the full on-position in one direction, means for including the other of the windings in the motor circuit when the controller is in the full on-position in the opposite direction, and means for holding the switches closed as long as current flows through their contacts.

14. In a current-varying controller, a circuit, resistance therefor, means for cutting out a portion of the resistance, only when the current in the circuit is below a certain value, the said means comprising a magnetically-operated switch, a winding for the switch energized by the current in the circuit, a manually-operated controller for regulating the resistance, and a contact for energizing the winding in a certain position of the controller.

Signed at Cleveland, Ohio, this 24th day of November, A. D. 1911.

JAY H. HALL.

Witnesses:
R. H. BENNETT,
H. M. DIEMER.